UNITED STATES PATENT OFFICE.

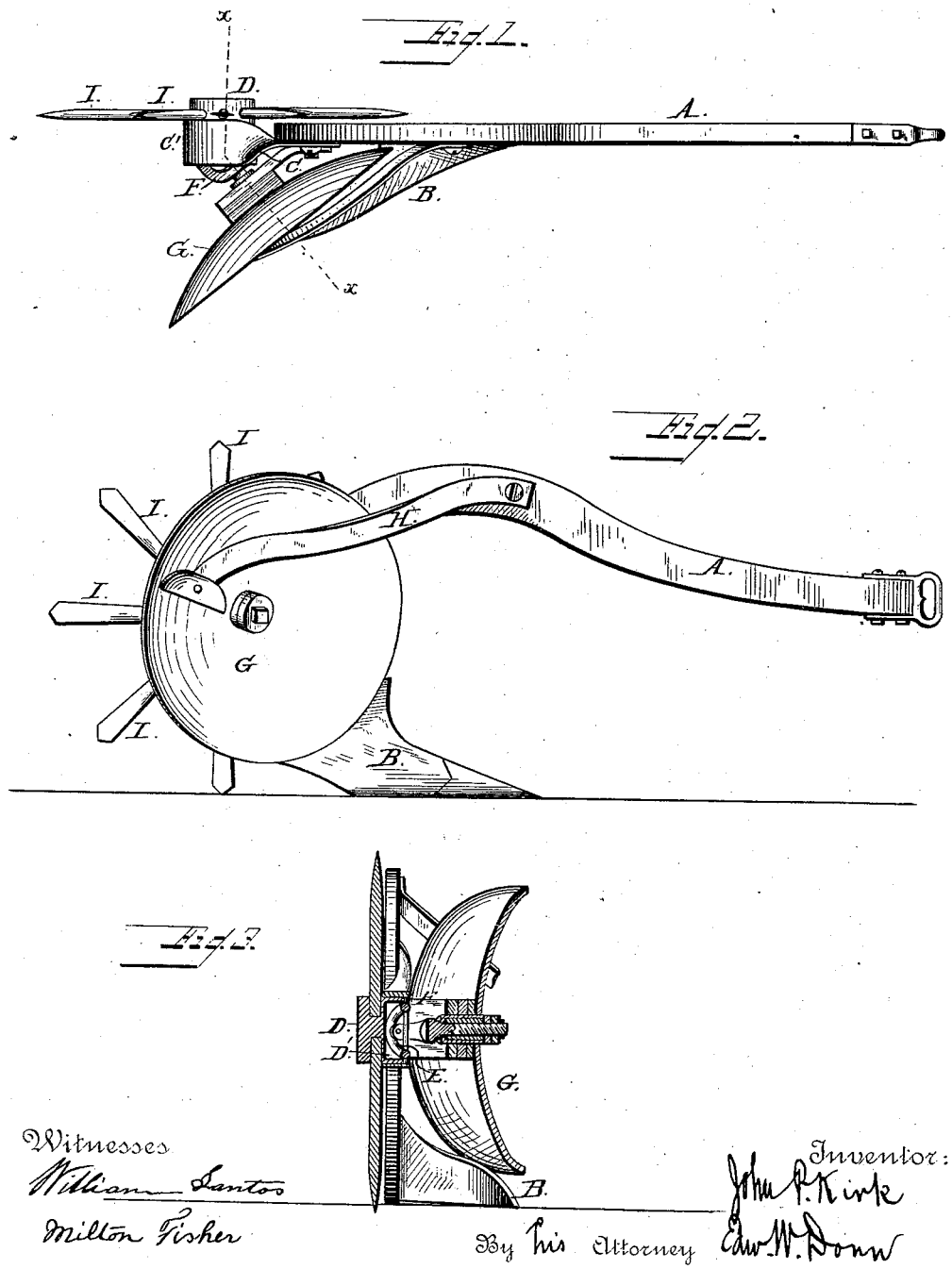

JOHN P. KIRK, OF AUSTIN, TEXAS.

PLOW.

SPECIFICATION forming part of Letters Patent No. 371,594, dated October 18, 1887.

Application filed March 19, 1887. Serial No. 231,594. (No model.)

*To all whom it may concern:*

Be it known that I, JOHN P. KIRK, a citizen of the United States, residing at Austin, in the county of Travis and State of Texas, have invented certain new and useful Improvements in Plows; and I do hereby declare the following to be a full, clear, and exact description of the invention, such as will enable others skilled in the art to which it appertains to make and use the same.

My present invention is an improvement in that class of plows provided with rotary mold-boards which set out of the line of movement or draft, and it forms a variation of the principle wherein motion is transmitted from a driving-wheel treading in the furrow of the land by a universal joint to the said mold-board, said wheel being set at any desired angle with reference to the said line of draft.

In a previous application, now pending, I have illustrated and described a rotary mold-board provided with a hub fixed thereto, to form a part of a universal joint, which is connected to the driving-wheel through the medium of a system of cog-gearing, the said hub fitting snugly within a band secured permanently at a given angle to the plow-beam. In the present application I propose to illustrate, describe, and claim a hub as a part of the driving-wheel for the mold-board, said hub forming a part of the universal joint which transmits motion to the said mold-board without gear-wheels, the shaft of said universal joint being connected directly to the rotary mold-board, and the hub in which the driving-wheel revolves being, as in the application referred to, fixed to the plow-beam directly in line with the draft.

In this application I dispense with the usual landside of the plow and substitute therefor the driving-wheel, which in this case has the outer ends of its arms flattened with the line of draft and pointed at their extremities, so that in the revolution of said wheel said arms will constantly cut the land as the plow advances.

In my drawings, Figure 1 is a plan or top view of the plow. Fig. 2 is a side elevation of the same. Fig. 3 is a transverse sectional view cut in the line *x x* of axes extending through the mold-board and driving-wheel.

Similar reference-letters indicate like parts in all of the figures.

Referring to the drawings, A is the plow-beam, to the lower end of which is fixed the plow B. A band, C, provided with an extension, C', is fixed to the curved portion of the plow-beam and extends backward, clasping the hub of the driving-wheel on the inside. The driving-wheel in this instance has a hub, a part, D, of which is solid and an inner part, D', of which is a hollow shell. Within the said hollow portion D', I pivot the ring E, cylindrical in cross-section, preferably; and at right angles to the axis of the pivot or pivots I pivot the knuckle F. To a shaft forming a part of this knuckle I bolt, between a washer and a nut on one side and bearing on the opposite side, a rotary mold-board, G. This mold-board, with the exception that it has no hub, is not unlike the mold-board of the first application referred to, it being of disk form, concave on its face. To the plow-beam I secure by suitable means a flexible arm, H, and to the end of said arm I pivot the head of said flexible arm, which head and arm form the scraper for the rotary mold-board, like that described in the previous application. Into the solid portion D of the hub of the driving-wheel I fix the radiating arms I, which have their free ends flattened in a plane at right angles to the axis of said wheel, and pointed to form cutters for the land as substitutes for the landside.

In the operation of my plow thus described, as the same is drawn by the power applied, the point of the said plow enters the soil, as usual, and the arms of the driving-wheel cut the same as they revolve. Motion is transmitted through the universal joint to the mold-board, while the land which is thrown aside by the plow-share is caught by the said mold-board as it rotates and carried outward from the line of draft until it meets the scraper, which causes it to drop to the ground, whether it be moist and crumbling or wet and mucky matter.

Having thus described my invention, what I claim as new, and desire to secure by Letters Patent, is—

1. A driving-wheel for the rotary mold-board of a plow, which consists of a hub having a hollow portion adapted for use with a universal joint and a solid portion, the latter provided with radial arms flattened in a manner coincident with the plane of draft and sharpened, substantially as set forth.

2. The combination, with the driving-wheel, as described, the rotary mold-board, and the plow-beam, of the universal joint composed of the hollow portion of the hub of the driving-wheel, a ring pivoted thereto, a knuckle pivoted to said ring, and a band encircling the hollow portion of said hub and fixed to the said plow-beam, substantially as and for the purpose set forth.

JOHN P. KIRK.

Witnesses:
M. M. JOHNSON,
FRED PECK.